United States Patent
Lin et al.

(10) Patent No.: US 7,335,108 B2
(45) Date of Patent: Feb. 26, 2008

(54) COMPOSITE DRIVE SHAFT WITH CAPTURED END ADAPTERS

(75) Inventors: Sherman S. Lin, North Richland Hills, TX (US); Scott D. Poster, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 394 days.

(21) Appl. No.: 10/511,658

(22) PCT Filed: Apr. 18, 2003

(86) PCT No.: PCT/US03/12423

§ 371 (c)(1),
(2), (4) Date: Oct. 18, 2004

(87) PCT Pub. No.: WO03/089145

PCT Pub. Date: Oct. 30, 2003

(65) Prior Publication Data

US 2005/0239562 A1    Oct. 27, 2005

(51) Int. Cl.
*F16C 3/02* (2006.01)
(52) U.S. Cl. ........................... 464/181; 464/182
(58) Field of Classification Search ............. 464/181, 464/182, 183; 156/172, 160; 403/359.1, 403/359.2, 359.6
See application file for complete search history.

(56) References Cited

U.S. PATENT DOCUMENTS

| | | | |
|---|---|---|---|
| 4,289,577 A | | 9/1981 | Mabuchi et al. |
| 4,561,799 A | * | 12/1985 | Arena ........................ 403/285 |
| 5,304,012 A | * | 4/1994 | Wendling ................... 403/274 |
| 5,342,464 A | | 8/1994 | McIntire et al. |
| 6,336,986 B1 | | 1/2002 | Lee et al. |
| 6,932,118 B2 | * | 8/2005 | Saha et al. .................. 138/109 |
| 2002/0041790 A1 | | 4/2002 | Suzuki et al. |

FOREIGN PATENT DOCUMENTS

| | | |
|---|---|---|
| DE | 195 24 901 A1 | 4/1997 |
| DE | 195 24 903 A1 | 4/1997 |
| EP | 474441 A2 * | 3/1992 |
| EP | 1 018 603 A2 | 7/2000 |

OTHER PUBLICATIONS

Supplementary European Search Report dated Jan. 18, 2001 for European Application No. EP 03 71 9885.

* cited by examiner

*Primary Examiner*—Kenneth Thompson
(74) *Attorney, Agent, or Firm*—James E. Walton

(57) ABSTRACT

A composite drive shaft in which the end adapters are captured in the composite material portion during the process of manufacturing of the composite drive shaft assembly is disclosed. The end adapters include lugs that protrude outward longitudinally to transmit torque, tensile, and compressive forces, and bending moments to the composite material portion and vice versa. To increase the load carrying capacity for axial force and bending moment, the end adapters may have at least one recessed circumferential groove. Before the manufacturing process, one or more bonding agents may be applied onto the interface of the end adapter to enhance the performance of engagement between the end adapters and the composite material portion. The composite material portion and end adapters are co-cured to produce a final drive shaft that requires no additional work for assembly.

16 Claims, 7 Drawing Sheets

COMPOSITE DRIVE SHAFT WITH CAPTURED END ADAPTERS

TECHNICAL FIELD

The present invention relates to composite drive shafts.

DESCRIPTION OF THE PRIOR ART

Composite drive shafts have been in use for many years. Because they are lighter than metallic drive shafts, they are particularly useful in industries where weight is a significant concern, such as in the aircraft industry and the automotive industry. Composite drive shafts usually consist of a composite material portion with a metallic end adapter connected to each end of the portion.

One the of the biggest challenges associated with composite drive shafts is connecting end adapters to the composite material portion. There are basically three ways to connect the end adapters to the composite material portion: (1) by mechanically bolting the end adapters to the composite material portion; (2) by clamping or biting into the composite material with a serrated end adapter; and (3) by adhering the end adapter to the composite material portion. The first method is currently used in the aircraft industry, the second method is currently used in the automotive industry, and the third method can only be used in low torque applications.

All of these methods have significant disadvantages. Mechanically bolting the end adapters to the composite material portion is very labor intensive and expensive. The mechanical bolts increase the part count associated with the shaft, and add weight to the shaft. In addition, bolt holes must be drilled through the composite material and end adapter, which can lead to crack initiation and propagation causing potential failure of the shaft. Clamping or biting into the composite material portion with a serrated end adapter diminishes the integrity of the composite material and reduces the strength of the drive shaft. As for adhering the end adapters to the composite material portion by adhesive, this method is limited to low torque applications. Moreover, the adhesive joint may not function properly when undetectable a manufacturing defect exists, or when improper handling occurs during service.

Thus, although the foregoing represent great strides in composite drive shaft technology, many shortcomings remain.

SUMMARY OF THE INVENTION

There is a need for a composite drive shaft with captured end adapters.

Therefore, it is an object of the present invention to provide a composite drive shaft in which the end adapters are captured in the composite material portion during the process of manufacturing.

This object is achieved by providing a composite drive shaft in which the end adapters are captured in the composite material portion during the process of manufacturing.

The composite drive shaft according to the present invention provides significant benefits and advantages, including: (1) the costs of manufacturing the shaft are lower; (2) the shaft is less susceptible to corrosion; (3) the shaft has greater strength; (4) the shaft is lighter; (5) because the end adapters do not clamp or bite into the composite material, the integrity of the composite material is maintained; (6) because bolts are not necessary, fewer parts are necessary; (7) because bolt holes are not drilled through the composite material and end adapters, crack initiation and propagation is greatly reduced; (8) the shaft can be used in high speed and high torque applications; (9) post-cure cutting and machining of the composite material portion are minimized; and (10) the end adapters can be recovered from defective or damaged assemblies and re-used.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
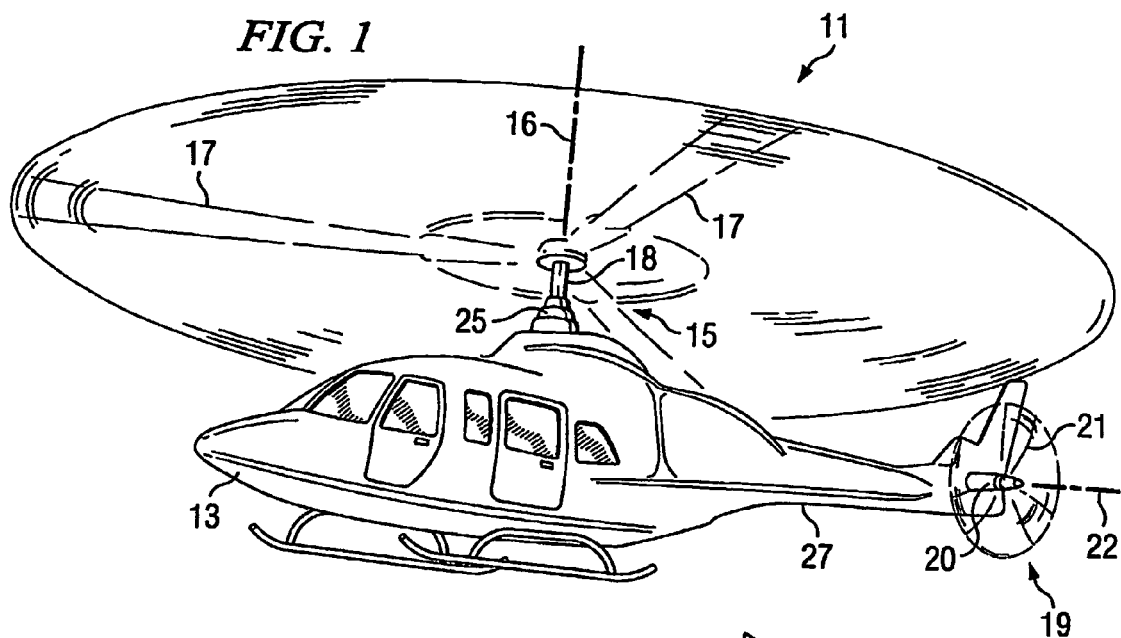
FIG. 1 is a perspective view of a helicopter having a composite drive shaft with captured end adapters according to the present invention.

Referring to FIG. 1 in the drawings, a helicopter 11 having a composite drive shaft with captured end adapters according to the present invention is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Main rotor blades 17 and tail rotor blades 21 are driven by a drive means 25 carried by fuselage 13. Torque is transmitted from drive means 25 to tail rotor assembly 19 through at least one composite drive shaft having captured end adapters that is disposed within a tail boom 27.

Figure 2A:
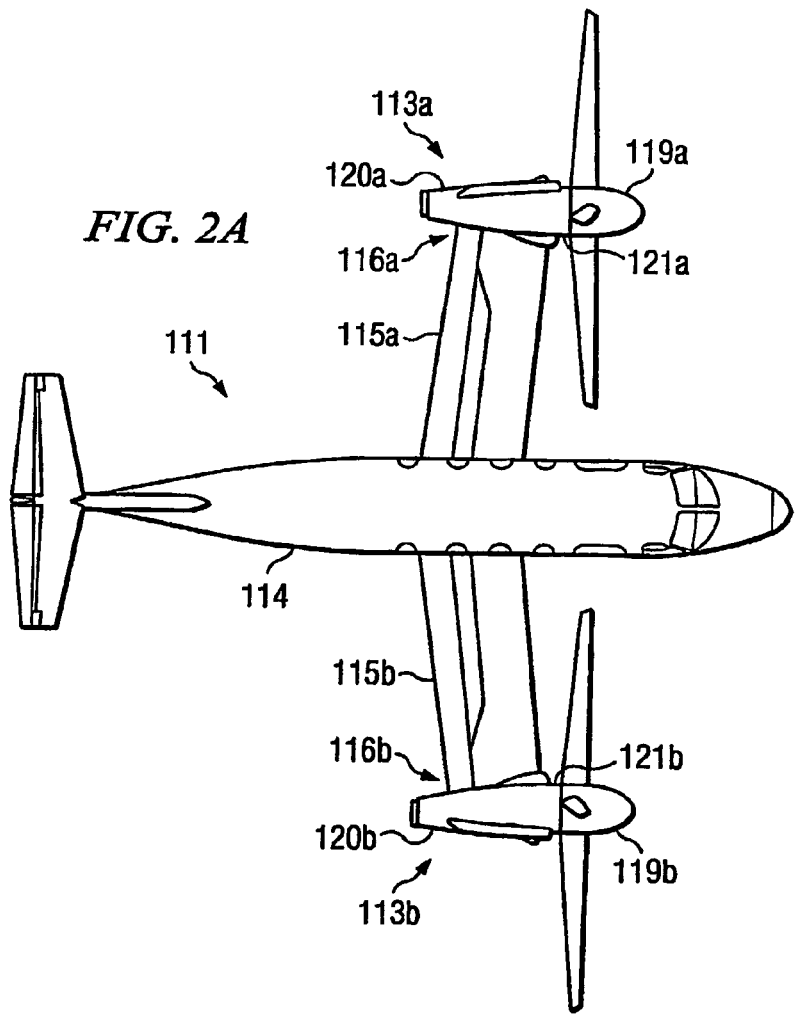
FIG. 2A is a plan view of a tilt rotor aircraft having a composite drive shaft with captured end adapters according to the present invention in an airplane mode.
Figure 2B:
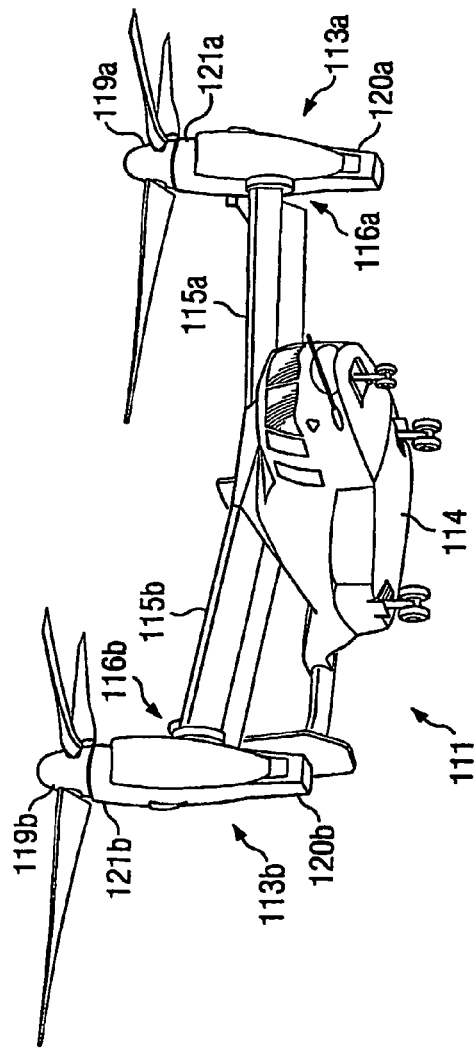
FIG. 2B is a perspective view of another tilt rotor aircraft having a composite drive shaft with captured end adapters according to the present invention in a helicopter mode.

The present invention may also be utilized on other types of rotary wing aircraft. Referring now to FIGS. 2A and 2B in the drawings, a tilt rotor aircraft 111 according to the present invention is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is depicted as a civilian-type tilt rotor aircraft, and is shown in the airplane mode; and in FIG. 2B, tilt rotor aircraft 111 is depicted as a military-type tilt rotor aircraft, and is shown in the helicopter mode. As shown in FIGS. 2A and 2B, wings 115a and 115b are coupled to a fuselage 114. Tilt rotor aircraft 111 includes at least one composite drive shaft having captured end adapters that passes through wings 115a and 115b and fuselage 114 from tilt rotor assembly 113a to tilt rotor assembly 113b.

Figure 3:
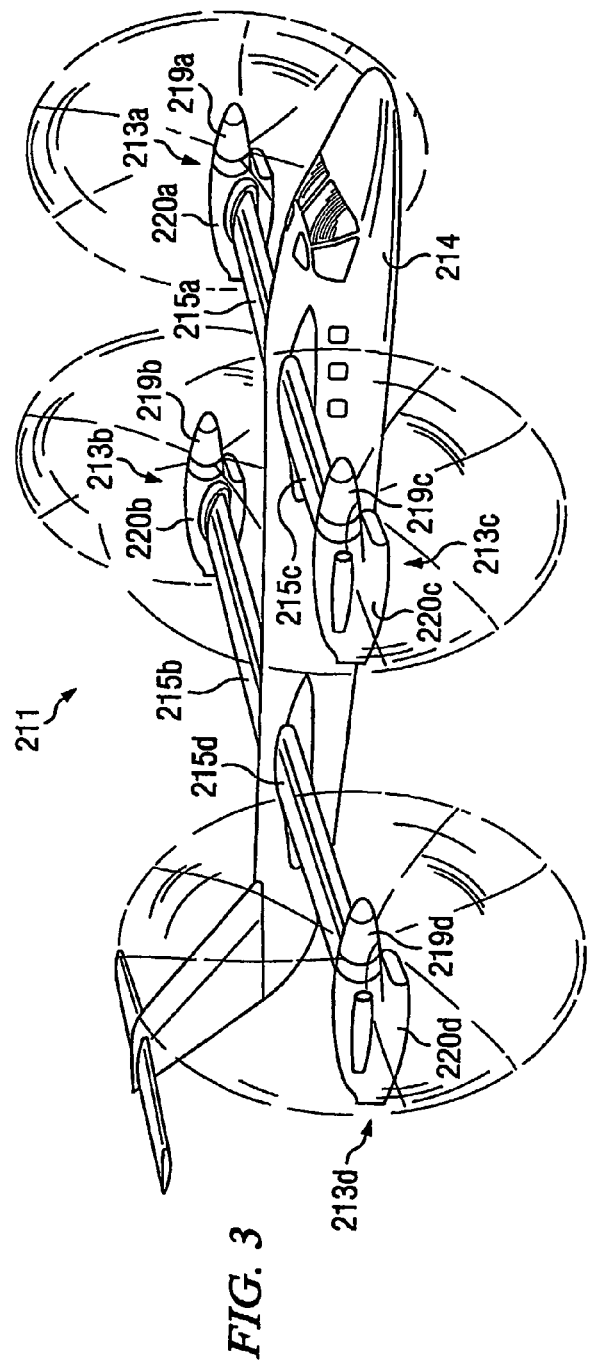
FIG. 3 is a perspective view of a quad tilt rotor aircraft having a composite drive shaft with captured end adapters according to the present invention in the airplane mode.

Referring now to FIG. 3 in the drawings, a quad tilt rotor aircraft 211 having a composite drive shaft with captured end adapters according to the present Invention is illustrated. As with the tilt rotor aircraft of FIGS. 2A and 2B, tilt rotor assemblies 213a, 213b, 213c, and 213d are carried by wings 215a, 215b, 215c, and 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Quad tilt rotor aircraft 211 includes at least one composite drive shaft having captured end adapters that passes through wings 215a and 215c and fuselage 214 from tilt rotor assembly 213a to tilt rotor assembly 213c, and/or at least one composite drive shaft having captured end adapters that passes through wings 215b and 215d and fuselage 214 from tilt rotor assembly 213b to tilt rotor assembly 213d. Quad tilt rotor aircraft 211 may also include at least one composite drive shaft having captured end adapters that passes through fuselage 214 in the fore and aft direction connecting the shaft system in forward wings 215a and 215c to the shaft system in aft wings 215b and 215d.

It should be understood that the present invention may be used with any aircraft on which it would be desirable to have a composite drive shaft with captured end adapters according to the present invention, including unmanned aerial vehicles that are remotely piloted. In addition, it will be appreciated that the present invention may be used in non-torque applications, such as an aircraft refueling boom or a landing gear actuator shaft. The composite drive shaft with captured end adapters may also be in other industries beside the aircraft industry, such as the automotive industry and the manufacturing industry. Indeed, the present invention may be used in any application in which it is desirable to have a low-weight, high-strength, high-speed, and/or high-torque composite drive shaft.

Figure 4:
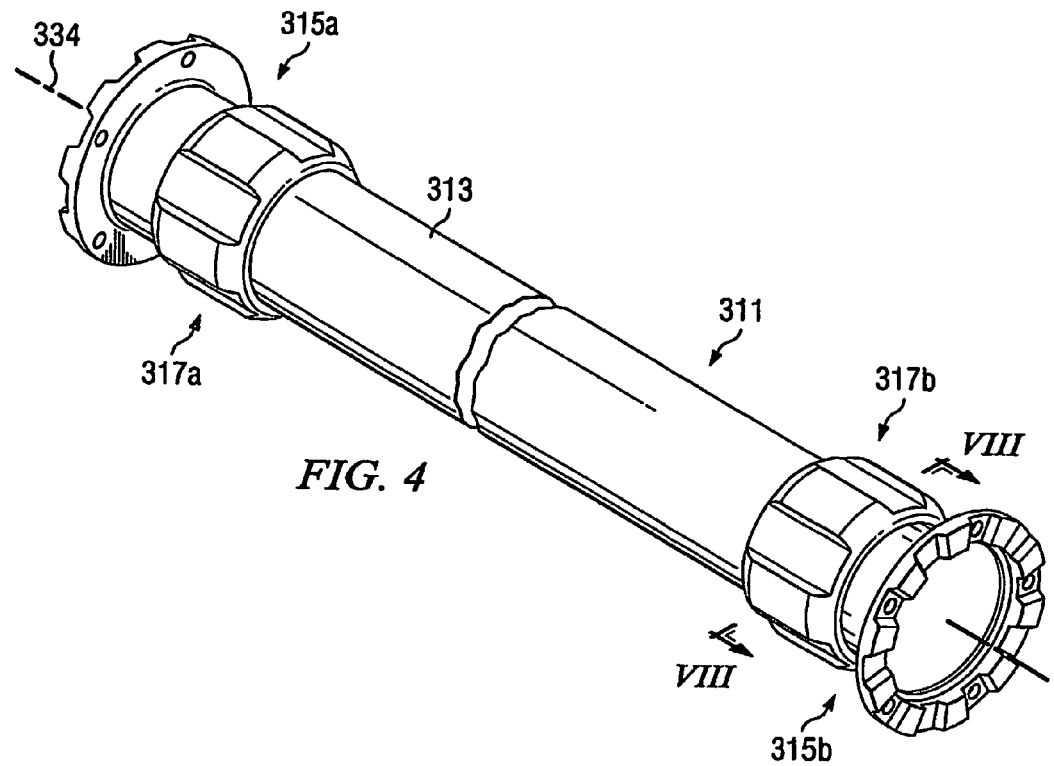
FIG. 4 is an isometric view of the composite drive shaft with captured end adapters according to the present invention.
Figure 9:
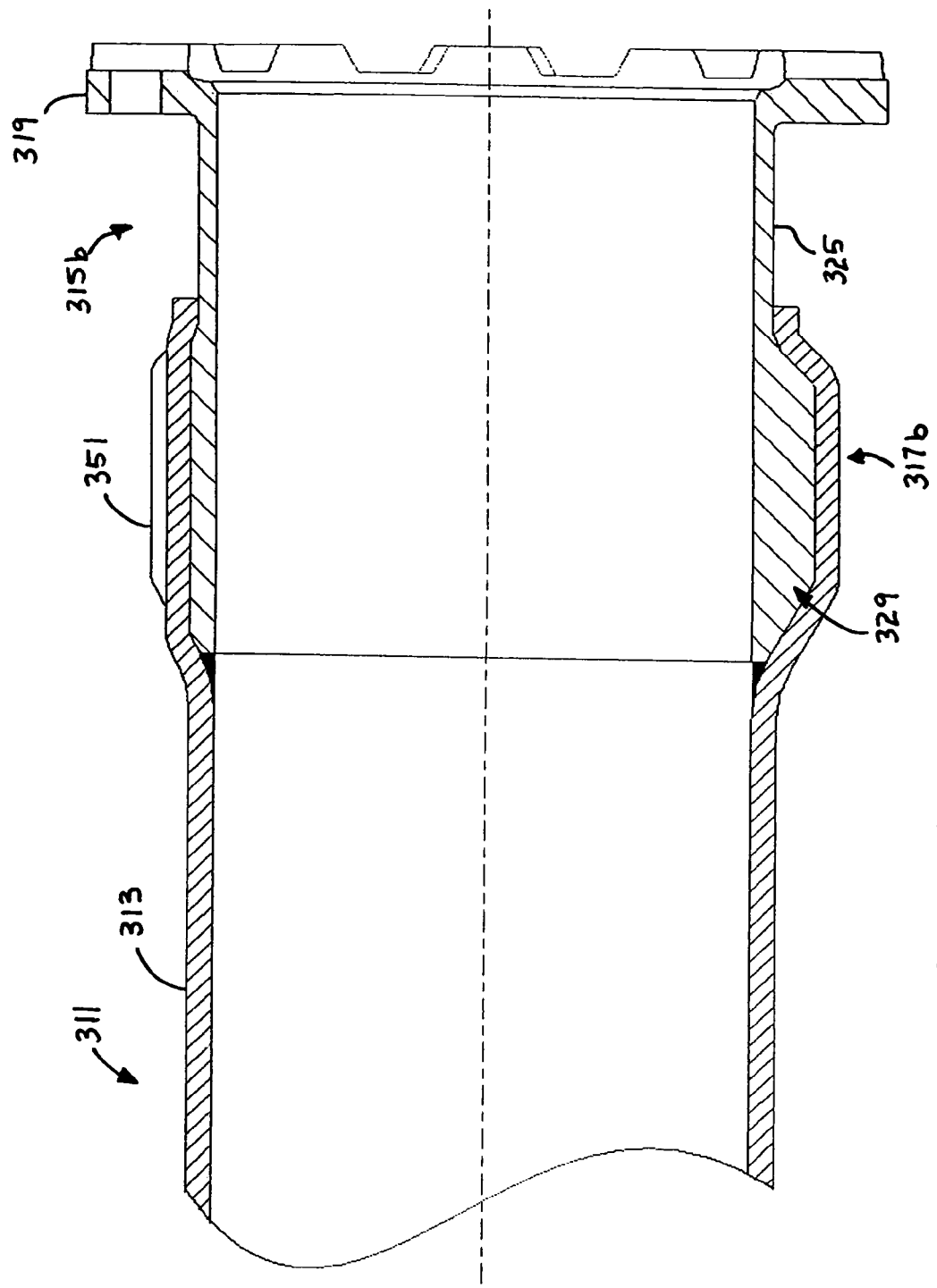
FIG. 9 is a partial longitudinal cross-sectional view of the composite drive shaft of FIG. 4.

Referring now to FIGS. 4 and 9 in the drawings, a drive shaft assembly 311 comprising a composite material portion, referred to herein as a composite tube 313, and captured end adapters 315a and 315b according to the present invention is illustrated. End adapters 315a and 315b are captured in composite tube 313 at end portions 317a and 317b of composite tube 313, respectively, during the process of manufacturing composite tube 313. In the preferred embodiment, composite tube 313 is a braided fiber and resin transfer molded component. Such components are typically more damage tolerant and have a higher ballistic survivability. The braided fiber may be either a two-dimensional or a three dimensional braided fiber. However, it should be understood that composite tube 313 may also be manufactured by filament winding, fiber placement, or any other processes that are deemed appropriate.

Although end adapters 315a and 315b are shown as being identical in shape and form, it will be appreciated that composite tube 313 may be manufactured such that end adapters 315a and 315b may be of different types, shapes and sizes to facilitate connection to a wide variety of different driving and driven components.

Figure 5:
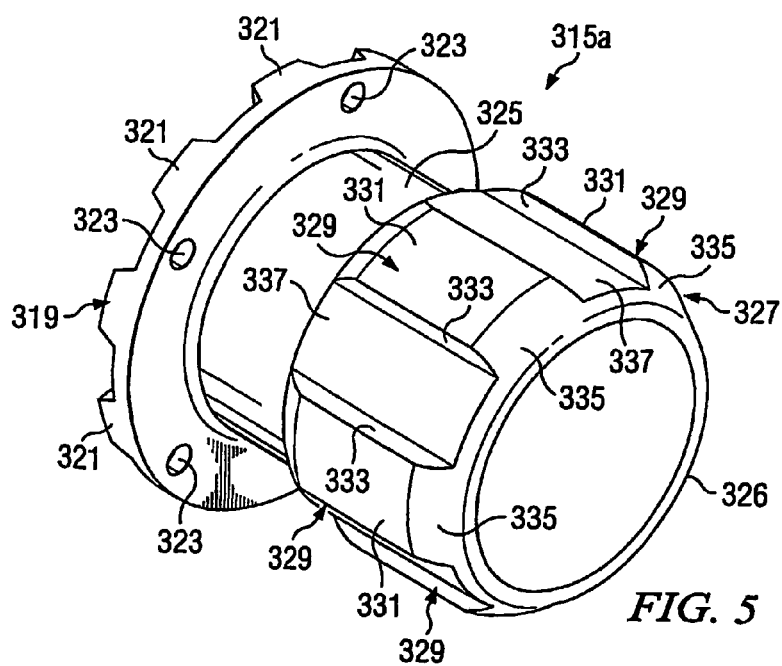
FIG. 5 is an isometric view of one of the end adapters of the composite drive shaft of FIG. 4.
Figure 6:
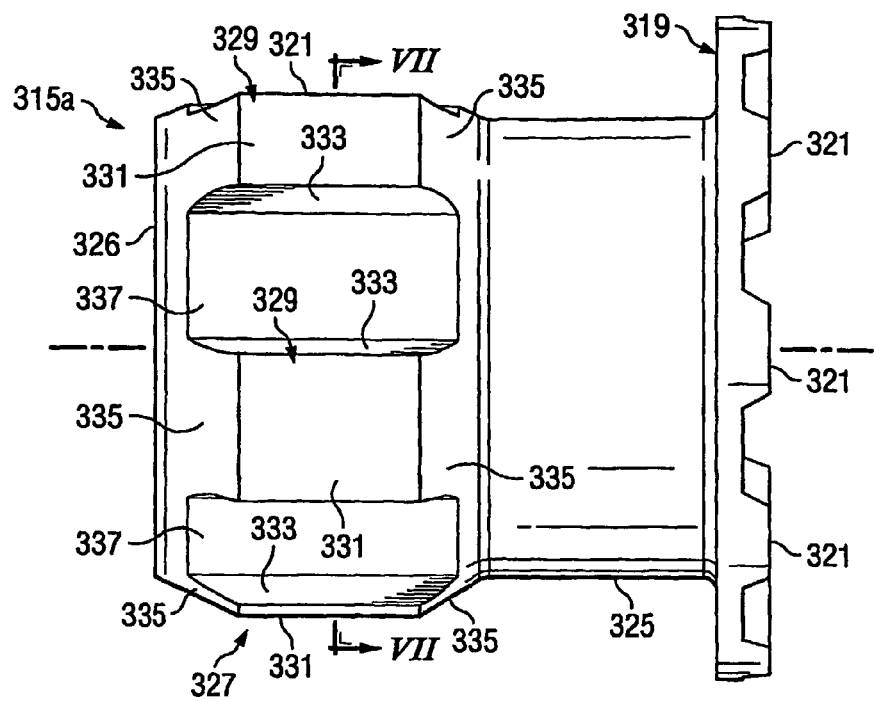
FIG. 6 is a side view of the end adapter of FIG. 5.
Figure 7:
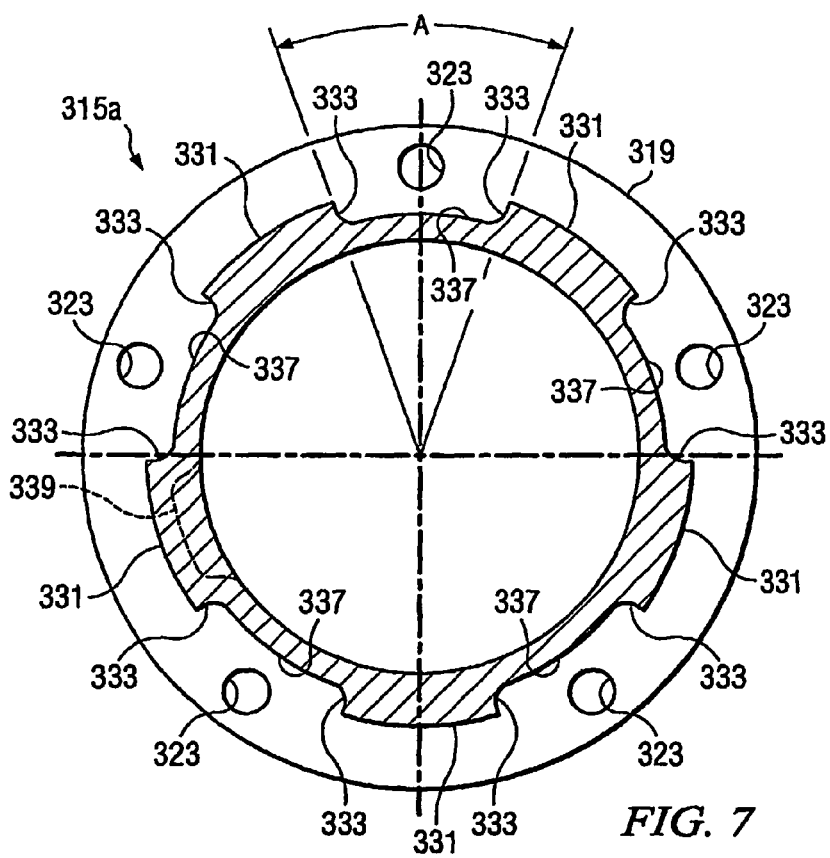
FIG. 7 is a cross-sectional view of the end adapter of FIG. 6 taken at VII-VII.

Referring now to FIGS. 5-7 in the drawings, end adapter 315a is illustrated prior to being captured during the process of manufacturing composite tube 313. It should be understood that any discussion or description herein of end adapter 315a applies equally to end adapter 315b, and vice versa. End adapter 315a is preferably formed from a metallic material, such as aluminum, titanium, or steel, but may be formed from any other suitable rigid material, including non-metallic material.

End adapter 315a preferably includes an interface portion 319 that is configured to be coupled to the end adapter of a driving or driven shaft or component (not shown). As is shown, interface portion 319 includes a plurality of optional spaced apart engagement teeth 321 and fastener holes 323. It will be appreciated that optional engagement teeth 321 and fastener holes 323 are representative of any type of clamping or clasping means for coupling end adapter 315a to the driving or driven shaft or component. Interface portion 319 transitions into a neck portion 325. Neck portion 325 may be configured in a wide variety of cross-sectional shapes and sizes, depending upon the desired application. For example, as is shown, neck portion 325 has a reduced cross-sectional area. This allows clearance for and easy access to fasteners (not shown) that pass through fastener holes 323. It will be appreciated that in some applications, neck portion 325 may not be necessary. End adapter 315a terminates opposite interface portion 319 with an interior end 326.

Figure 8:
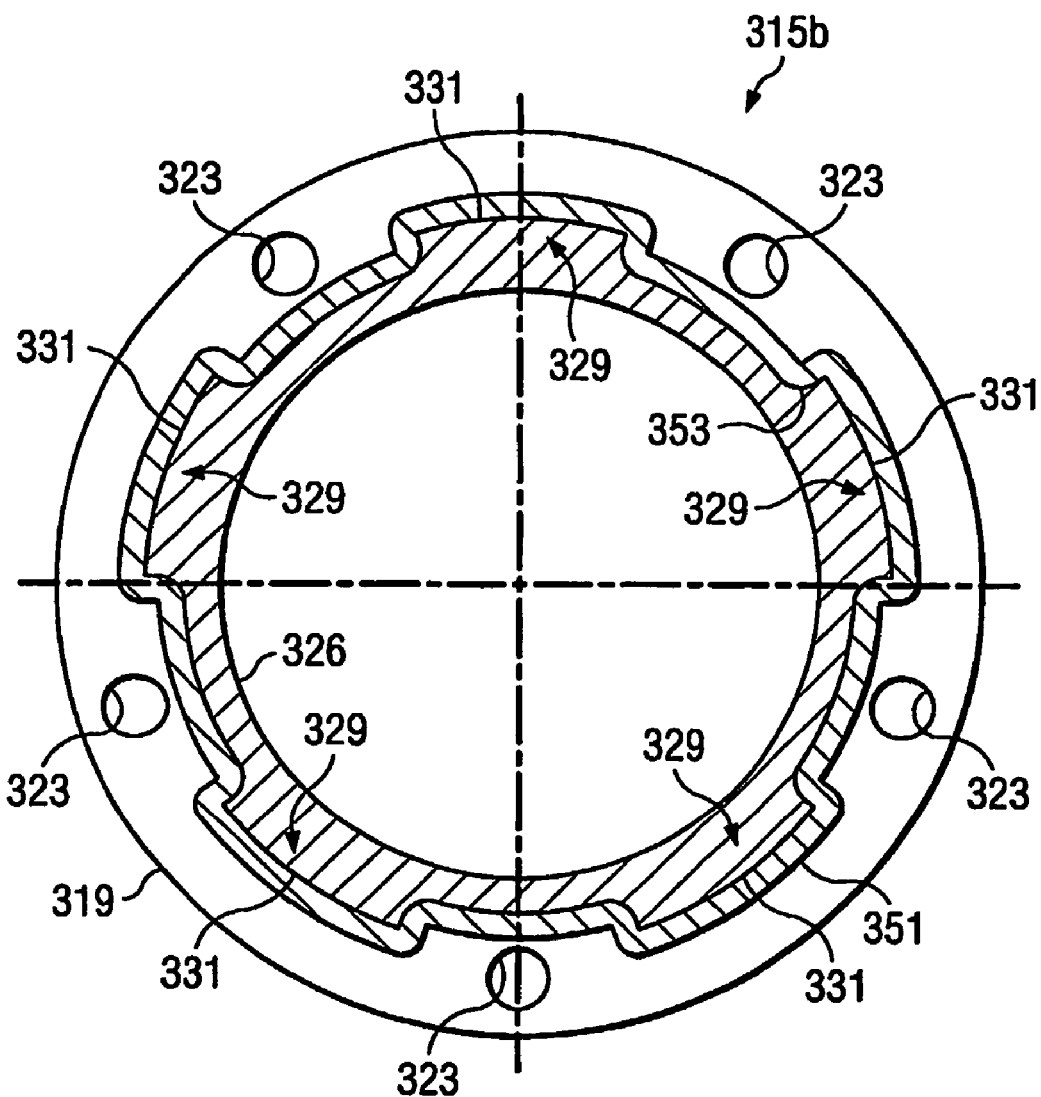
FIG. 8 is a cross-sectional view of the adapter-tube interface of the composite drive shaft taken at VIII-VIII of FIG. 4.

End adapter 315a includes an adapter-tube interface 327 that is configured to engage composite tube 313. In the preferred embodiment, adapter-tube interface 327 comprises a plurality of lugs 329 spaced around the periphery of adapter-tube interface 327. Lugs 329 protrude radially outward to engage the interior surface of composite tube 313, as is shown in FIG. 8, between lugs 329 and composite laminate 351. Each lug 329 includes a lug face 331, opposing lug flanks 333, and opposing lug ends 335. Lugs 329 are separated by a generally longitudinal groove having a bottom that is referred to herein as a lug base 337.

Lug faces 331 form circumferentially exterior top surfaces that engage the circumferentially interior surface of composite tube 313, as shown in FIG. 8. Lug faces 331 may be smooth, flat, or curved. Opposing lug flanks 333 are preferably radially aligned longitudinal surfaces having filet radii. As will be explained in more detail below, the filet radii function to reduce stress concentration and provide a smooth transition for the fibers of composite tube 313. Opposing lug flanks 333 function to transmit torque from end adapter 315a to composite tube 313 and vice versa. The leading lug flank 333 of one lug 329 and the trailing lug flank 333 of the adjacent lug 329 form an angle A. The number of lugs 329 and angle A are determined by the design requirements of the drive shaft, including the load and stress distributions for optimized drive shaft strength, and the method of mating the drive shaft with other components or shafts. It will be appreciated that lug flanks 333 may be angled with respect to an axis 334 of the drive shaft, or may be crowned. In this manner, lead correction can be applied to lugs 329. Opposing lug ends 335 transition from neck portion 325 at one end and from interior end 326 at the opposing end, and taper toward each other with increasing radial distance. Opposing lug ends 335 function to support axial tensile and compressive loads and bending moments. It will be appreciated the taper of lug ends 335 may be steep, such as 90°, to carry additional axial forces and bending moments. Lug bases 337 may be flat, smooth, or curved.

Although end adapter 315a is shown disposed partly within composite tube 313 and partly outside of composite tube 313, it should be understood that end adapter 315a may be disposed entirely within composite tube 313, and may include an internal interface portion.

In an alternate embodiment, lugs 329 are hollowed out, as is indicated by the dashed line 339 in FIG. 7. This hollowing out of one or more of lugs 329 reduces the weight of end adapter 315a.

Figure 10:
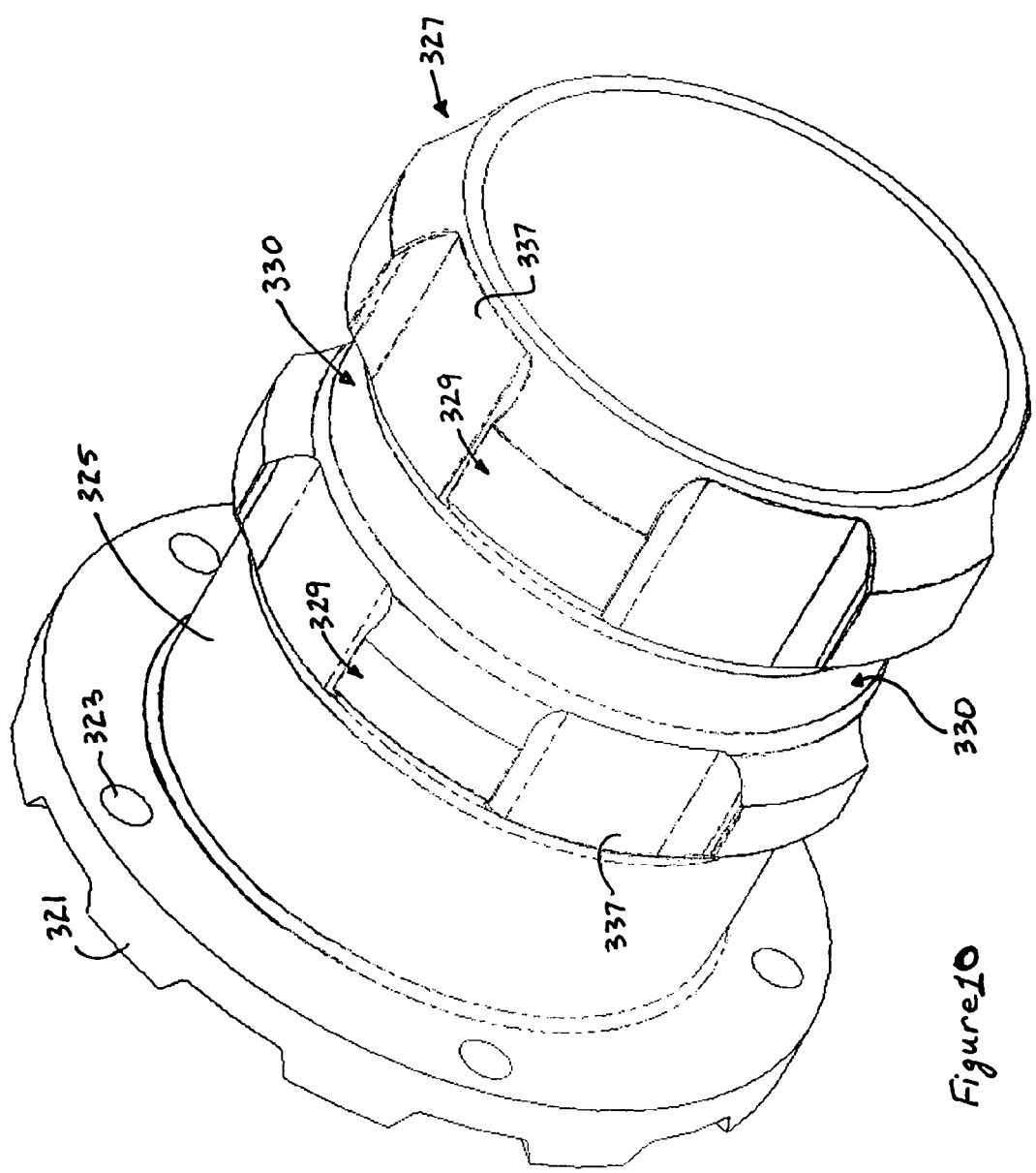
FIG. 10 is a perspective view of an alternate embodiment of the end cap of FIG. 5.

As shown in FIG. 10, in another alternate embodiment, at least one circumferential groove 330 across lug faces 331 (not shown) and extending radially inward from lug faces 331 may be included to further facilitate bending moments. In such embodiments, it is preferred that the circumferential grooves extend radially inward to lug base 337.

Referring now to FIG. 8 in the drawings, end adapter 315b interfaced with composite tube 313 is shown in a cross-sectional view taken at VIII-VIII of FIG. 4. As is shown, lugs 329 of end adapter 315b are captured by the layers of composite laminate 351 that is part of composite tube 313. As set forth above, in the preferred embodiment, composite laminate 351 is a braided composite. This capturing process is performed during the process of laying up and manufacturing composite tube 313. In the preferred embodiment, lugs 329 are entirely surrounded by braided fibers 351. The layering of composite laminate 351 down to lug bases 337 between lug flanks 333 provides a positive engagement between composite tube 313 and end adapters 315a and 315b for the transmission of torque. This configuration eliminates the need to rely solely upon the stiffness of the components and/or the adhesion between the components to transfer the torque, as is required in hexagonal connections and circular connections with adhesive. Filets 353 at the intersection of lug flanks 333 and lug bases 337 aid in reducing stress concentrations in composite laminate 351 and lugs 329. Filets 353 also provide a smooth transition from lug bases 337 to lug flanks 333 to prevent a resin rich situation at the intersection.

The preferred process of manufacturing drive shaft assembly 311 will now be described. First, end adapters 315a and 315b of a selected configuration are placed on an elongated mandrel. Then, composite tube 313, which comprises polymer or plastic fibers, is applied over the mandrel and end adapters 315a and 315b by an appropriate braiding technique, such as two-dimensional or three dimensional braiding, to form a composite preform. In some applications, it may be desirable to place an adhesive film on the adapter-tube interface between end adapter 315a and the polymer or plastic fibers, so that the adhesive is disposed between end adapter 315b and composite tube 313. Next, one or more tools or molds configured to match the composite preform, including end adapters 315a and 315b, the mandrel, and the composite tube 313, are clamped down over the entire assembly. Then, the assembly is heated, evacuated, injected with resin, and cured to form drive shaft assembly 311.

As set forth above, in alternate embodiments, composite tube 313 may be formed by other means, such as filament winding, filament placement, or any other type of composite manufacturing technique. In such instances, pre-impregnated fibers are applied over the mandrel and end adapter 315b by filament winding or filament placement processes. The assembly is then enclosed in vacuum bags and evacuated. Next, the resin is cured. Then, the vacuum bags and mandrel are removed.

Because no fasteners are required, no drilling of fastener holes is necessary, and no fasteners protrude outward. This reduces the possibility of interference with electrical lines, hydraulic lines, and other components when installed and operated on the aircraft. The only post-cure processing that is required is simple trimming of the exposed ends of composite laminate 351. By manufacturing drive shaft assembly 311 in this manner, misalignment of end adapters 315a and 315b is greatly reduced, and little or no balance correction is required.

It will be appreciated that end adapters 315a and 315b can be recovered from drive shaft assembly 311 by simply burning off composite laminate 351, should any drive shaft assembly 311 either contain a manufacturing defect, or become damaged during use. This ability to recover and re-use end adapters 315a and 315b represents tremendous savings in labor, time, and cost.

The composite drive shaft according to the present invention provides significant benefits and advantages, including: (1) the costs of manufacturing the shaft are lower; (2) the shaft is less susceptible to corrosion; (3) the shaft has greater strength; (4) the shaft is lighter; (5) because the end adapters do not clamp or bite into the composite material, the integrity of the composite material is maintained; (6) because bolts are not necessary, fewer parts are necessary; (7) because bolt holes are not drilled through the composite and end adapters, crack initiation and propagation is greatly reduced; (8) the shaft can be used in high speed and high torque applications; (9) post-cure cutting and machining of the composite tube are minimized; and (10) the end adapters can be recovered from damaged assemblies and re-used.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A drive shaft comprising:
   an elongated composite laminate shaft portion having opposing ends; and
   at least one end adapter disposed at one end of the composite laminate shaft portion, the end adapter being captured into the composite laminate shaft portion during the process of manufacturing the composite laminate shaft portion;

wherein the end adapter comprises:

a component interface portion adapted for coupling to a driving or driven component; and an adapter-tube interface portion;

wherein the adapter-tube interface portion is adapted to be captured into the composite material portion during the process of manufacturing;

wherein the end adapter further comprises:

at least one outwardly protruding lug disposed at the adapter-tube interface portion;

wherein each lug comprises:

a circumferentially exterior lug face;

a lug flank on each side of the lug face for transmitting torque from the end adapter to the composite material portion and vice versa;

a lug base between the lug flanks of adjacent lugs; and a tapered lug end on each longitudinal end of the lug for supporting axial tensile loads, axial compressive loads, and bending moments.

2. The drive shaft according to claim 1, wherein the end adapter is metallic.

3. The drive shaft according to claim 1, wherein the composite material portion is formed from a braided fiber and resin transfer molded composite.

4. The drive shaft according to claim 3, wherein the braided fiber is a two-dimensional braided fiber.

5. The drive shaft according to claim 3, wherein braided fiber is a three-dimensional braided fiber.

6. The drive shaft according to claim 1, wherein the composite material portion is formed from a filament wound composite.

7. The drive shaft according to claim 1, wherein the end adapter further comprises:

a means for transferring torque from the end adapter to the composite material portion and vice versa.

8. The drive shaft according to claim 1, wherein the end adapter further comprises:

a layer of adhesive disposed between the end adapter and the composite material portion.

9. The drive shaft according to claim 1, wherein the end adapter further comprises:

a neck portion disposed between the component interface portion and the adapter-tube interface portion, the neck portion having a reduced cross-sectional area.

10. The drive shaft according to claim 1, wherein the end adapter further comprises:

at least one recessed circumferential groove around the adapter-tube interface portion.

11. The drive shaft according to claim 1, wherein the lug flanks of adjacent lugs are radially aligned.

12. The drive shaft according to claim 1, wherein the lug flanks are longitudinally angled from zero to any degree.

13. The drive shaft according to claim 1, wherein the lug flanks include a longitudinal crown.

14. The drive shaft according to claim 1, wherein the lug is solid.

15. The drive shaft according to claim 1, wherein the lug is hollowed out to reduce weight.

16. The drive shaft according to claim 1, wherein the end adapter is non-metallic.

* * * * *